United States Patent [19]
Skaggs

[11] 3,887,810
[45] June 3, 1975

[54] PHOTON-MULTIPLIER IMAGING SYSTEM

[75] Inventor: Frank Lee Skaggs, Dallas, Tex.

[73] Assignee: Texas Instruments Incorporated, Dallas, Tex.

[22] Filed: Jan. 2, 1973

[21] Appl. No.: 320,392

[52] U.S. Cl.......... 250/333; 250/213 VT; 250/332; 250/370; 315/11
[51] Int. Cl. .................. H01j 31/50; G01t 1/16
[58] Field of Search .......... 250/370, 211 J, 213 VT, 250/345, 578; 315/11

[56] References Cited
UNITED STATES PATENTS

| | | | |
|---|---|---|---|
| 2,678,400 | 5/1954 | McKay | 250/370 |
| 3,201,630 | 8/1965 | Orthuber et al. | 250/213 VT |
| 3,488,508 | 1/1970 | Weimer | 250/578 |
| 3,523,208 | 8/1970 | Bodmer et al. | 313/66 |
| 3,634,692 | 1/1972 | Padovini | 250/211 J |
| 3,673,457 | 6/1972 | Sackinger | 250/213 VT |
| 3,714,439 | 1/1973 | Williams et al. | 250/213 VT |
| 3,714,491 | 1/1973 | McIntyre et al. | 250/211 J |
| 3,748,523 | 7/1973 | Beyer et al. | 250/213 VT |

Primary Examiner—Maynard R. Wilbur
Assistant Examiner—S. C. Buczinski
Attorney, Agent, or Firm—Harold Levine; Edward J. Connors, Jr.; Stephen S. Sadacca

[57] ABSTRACT

A photo-imaging system having substantially increased sensitivity is described. Impinging photons are focused upon a photo-emissive cathode of an electron accelerating tube. The cathode comprises a semiconductor material having a maximum sensitivity corresponding to a preselected wavelength. Responsive to photons corresponding to this preselected wavelength, electrons are generated and are accelerated to impinge upon an anode which comprises a semiconductor material. The high energy electrons generate electron-hole pairs in the semiconductor substrate corresponding to the energy of the accelerated electrons. The anode target provides amplified output signals corresponding to the impinging photons.

10 Claims, 7 Drawing Figures

Fig. 3

PHOTON-MULTIPLIER IMAGING SYSTEM

The present invention pertains to imaging systems in general, and more particularly to an improved photomultiplier imaging system.

Semiconductor imagers are utilized extensively in industry. By way of illustration, such sensors are used to detect reflected energy from a light source, such as a laser, particularly in military applications. In typical guidance control systems a spot of reflected light from a laser having a wavelength of 1.06 microns must be detected. In such systems the quadrant location of this spot of light on a detector provides guidance control signals, it being desired to keep the spot of light in the central region of the detector. To data, silicon quadrature detectors have been utilized extensively. These conventional quadrature detectors utilize high resistivity silicon, highly depleted to produce as high a quantum efficiency at 1.06 microns as possible. The quadrature detector locates the position of an imaged spot of light in terms of four quadrants of a circle. As the spot of light moves responsive to a different orientation of the monitored target with respect to the axis of the guided vehicle, the spot moves from the center of the detector (null position) to one of the quadrants, resulting in a signal output in that quadrant. This output is utilized to correct the trajectory of the vehicle so that the reflected "spot" is again in the null position.

To date, the sensitivity of know silicon quadrative detectors imposes serious restraints on system operations.

In a different aspect of semiconductor imagers the entire image, rather than just a spot of light for quadrature information, must be detected. Such detectors find utility, e.g., in television systems. By way of example, semiconductor charge coupled device imaging systems have been described in the literature. Reference, for example, Kovac et al., "Solid State Imaging Emerges From Charge Transport," *Electronics*, Feb. 28, 1972. The maximum sensitivity of this type of imagers is limited by the sensitivity of the semiconductor detector array. Means for increasing the sensitivity or for providing gain to the detected signals are required in order to improve detection, particularly in low light level environments.

In conventional tube-type solid state target imagers, such as the vidicon, where a solid state target is scanned by an electron beam, several disadvantages are apparent. First, circuitry for scanning the target is required. Secondly, for low signal information, the signal-to-noise ratio of conventional tube type imagers is impaired, due to the relatively high overall capacitance required for interconnecting the components.

Accordingly, an object of the present invention is the provision of an improved imager system having substantially improved sensitivity.

A further object of the invention is a quadrature detector wherein impinging photons are focused on a photoemissive cathode of a proximity tube and electrons generated thereby are accelerated to a semiconductor target anode.

An additional object of the invention is a charge coupled device imager having improved low light level capability.

Yet another object of the invention is a charge coupled device imager including provision for accelerating electrons generated by a photo-emissive cathode upon which impinging light is focused.

Briefly, in accordance with the invention, a photomultiplier imaging system having substantially improved sensitivity and signal to noise ratio is provided. The invention includes the provision of a photoemissive cathode structure in a proximity tube for receiving impinging photons. In one aspect of the invention, the cathode structure is defined to have maximum emission at a preselected wavelength, such as 1.06 microns. The anode of the proximity tube is defined by a semiconductor structure for generating an output signal responsive to impact ionization. Electrons emitted by the cathode are accelerated and strike the anode generating electron-hole pairs therein. Charge carriers thus generated are detected and provide the output signal.

More particularly, in accordance with a specific aspect of the invention, the photo-emissive cathode of a proximity tube comprises a III-V semiconductor compound which is sensitive to energy having a wavelength of 1.06 microns. Electrons emitted by the cathode are accelerated and subsequently impact the anode of the proximity tube. The anode is defined as a quadratured semiconductor body, such as silicon. Each quadrant of the anode has a separate lead therefrom whereby an electrical signal is produced in that quadrant responsive to impinging electrons. A spot of light reflected from a target is focused on a portion of the cathode. The accelerated electrons from the cathode impact the corresponding anode region, generating a substantial number of electron-hole pairs in that region. Thus, a relatively large output signal from the anode is produced in that quadrant corresponding to the position of the reflected spot of light. A gain on the order of about 1,500 to 2,000 is realized as compared to convention silicon quadrature detectors wherein a gain of only about one is realized. In such conventional structures the reflected spot of light is focused directly on the corresponding quadrant of the semiconductor detector.

In accordance with a different aspect of the invention, a semiconductor charge coupled device imager having enhanced low light level capabilities is provided. In this embodiment of the invention, a conventional semiconductor charge coupled device array is utilized as the imager. The image, however, is not impressed directly upon the target as is done conventionally. Rather, the image is focused on a planar photoemissive cathode of a proximity tube. Again electrons are emitted corresponding to the light intensity of the various regions of the target, and these electrons are accelerated to the semiconductor anode target. In this configuration a gain of around 2,000, as compared to conventional semiconductor charge coupled device imagers, is realized. Additional imager advantages are possible, since the amplifier and related circuitry may be produced on the same chip as the semiconductor target, thereby significantly reducing the circuit capacitance resulting in improved signal to noise ratio.

Other objects and advantages of the invention will be apparent upon reading the following detailed description of illustrative embodiments in conjunction with the drawings wherein.

Figure 5:
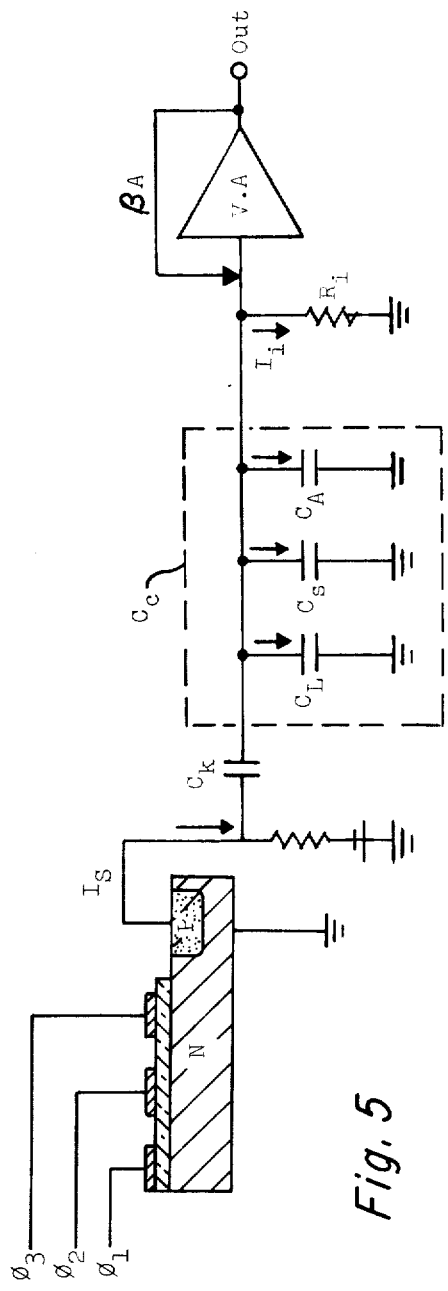
Figure 4:
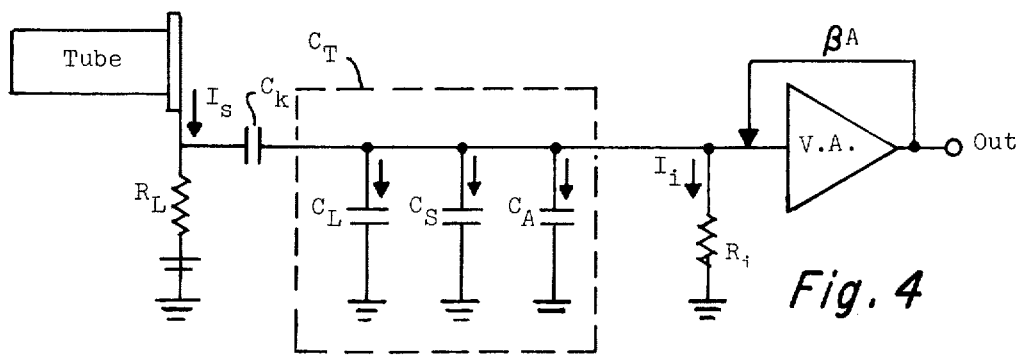
Figure 6:
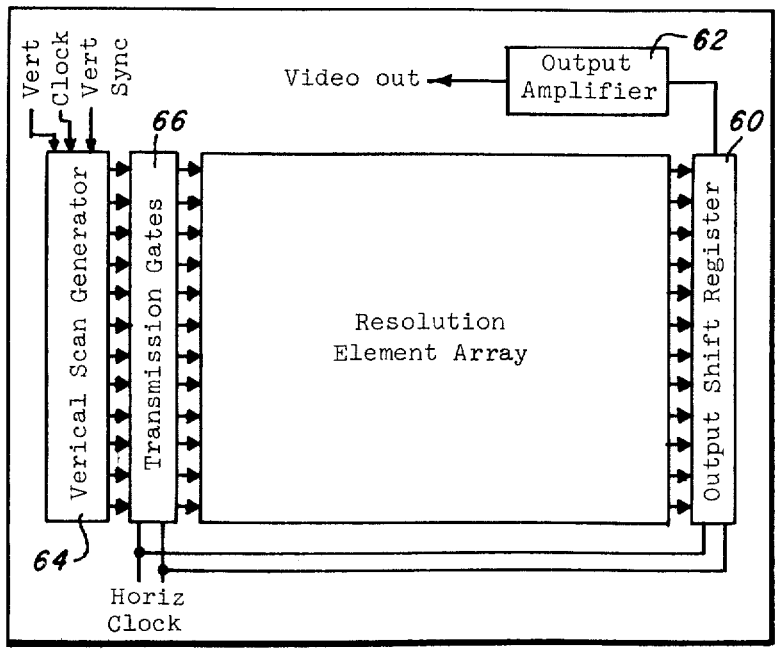
Figure 7:
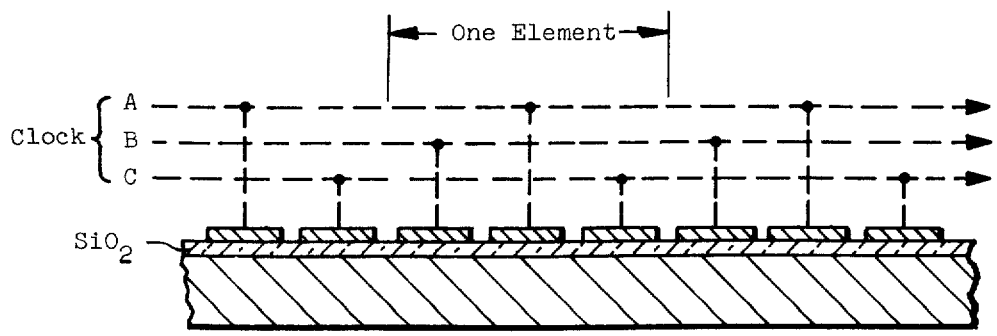

FIG. 4 schematically illustrates typical capacitances associated with different portions of a conventional tube type imager;

FIG. 5 schematically illustrates a charge coupled device imager in accordance with the present invention with associated typical capacitance values;

FIG. 6 is a plan view illustrating generally a typical charge coupled device imager target which may be used in accordance with the present invention; and FIG. 7 is a cross-sectional view of a portion of an integrated circuit three-phase CCD imager.

Figure 1:
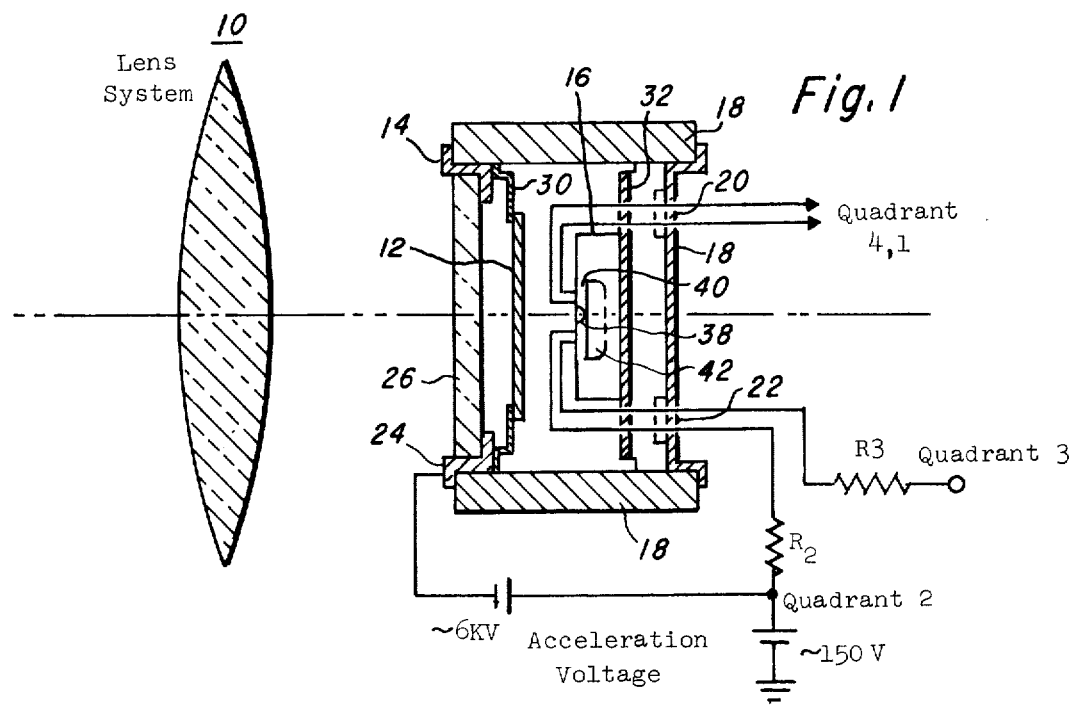
FIG. 1 is a cross-sectional view of a quadrant silicon detector photo-multiplier tube configuration in accordance with one embodiment of the present invention.

With reference now to the drawings, a quadrant photo-multiplier in accordance with the preferred embodiment of the present invention is illustrated in FIG. 1. A conventional lens system 10 focuses impinging radiation, such as a beam or "spot" of reflected light, onto a planar photo-emissive cathode 12 of a proximity tube. The proximity tube is shown generally at 14. In general, such tubes are used to image from a planar surface, such as cathode 12, to a planar surface, such as the detector 16, rather than from a curved surface to a curved surface. Typically, the detector is phosphorescent or impact ionization responsive. In accordance with the illustrated embodiment, the detector 16 is impact ionization responsive, and comprises a high resistivity depleted diode or avalanche diode quadrant semiconductor detector. Typically a high resistivity silicon quadrant detector exhibits a resistivity of about 10,000 ohm-cm.

The proximity tube is enclosed by a suitable housing 18 which may, e.g., comprise a ceramic. Leads from the cathode 12 and detector for biasing and signal output are extended through the housing 18 at 20, 22 and 24 in vacuum sealing relation in accordance with conventional fabrication techniques. A face plate, also in vacuum sealing relationship, is shown at 26. The faceplate is transparent to the radiation of interest, such as radiation having a wavelength of 1.06 microns.

The cathode 12 is suitably mounted within the interior of the proximity tube 14 by conventional mounting rings 30. In the preferred embodiment the cathode 12 is responsive to energy having a wavelength of 1.06 microns. Suitable cathode materials are Group III-V semiconductors, such as, by way of example, gallium arsenide and gallium indium arsenide. Gallium arsenide phosphide is advantageous when higher visible light responce is desired. Also, alkali cathodes, such as $A_a$—O—$G_s$ and K—$S_b$—$C_s$ are useful for many applications. Suitable cathode materials above described and their method of fabrication are known in the art.

Figure 2:
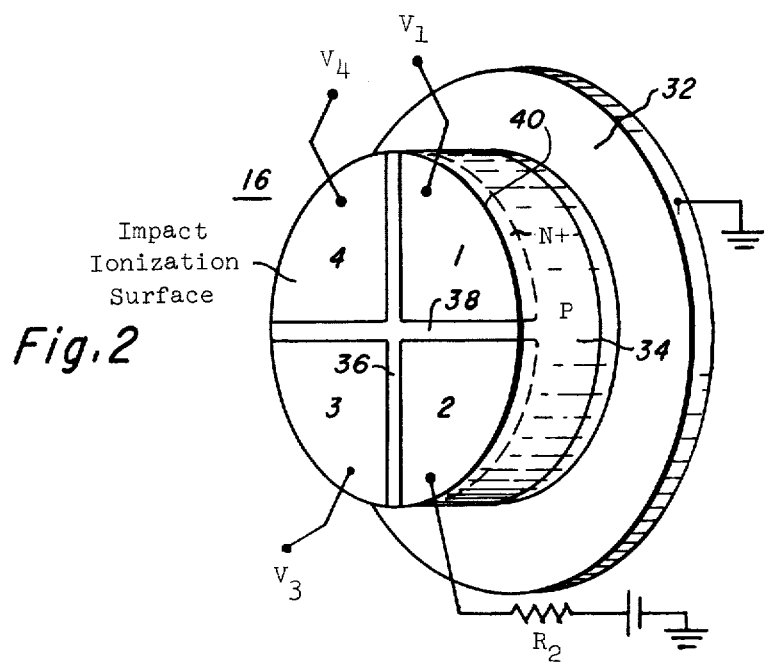
FIG. 2 is a pictorial illustration of a quadrature detector anode which may be used in the configuration shown in FIG. 1.

The anode 16 comprises a semiconductor, preferably silicon, impact ionization quadrant detector. Other semiconductor materials could of course be employed. The detector 16 is mounted within tube 14 on a suitable mounting substrate or header 32. With reference to FIG. 2 for the moment, the structure of the anode target 16 will be more apparent. By way of illustration, a high resistivity (p-) silicon slice 34 can be used as the starting material. Insulating strips 36 and 38 divide the slice into four quadrants, 1–4. The surface portion of the slice not covered by the insulating strips 36 and 38 is doped to form N+ regions 40 defining each of the quadrants. This structure basically defines four diodes. The depletion region produced by the P-N junction is shown at 42 (FIG. 1). When appropriate bias is applied to the detector the region under each quadrant is completely depleted, producing field lines perpendicular to the face of the slice. This accelerates electron-hole pairs produced responsive to impacting electrons in a direction perpendicular to the face of the slice such that there is no cross-talk between quadrants. Alternatively, the insulation strips 36 and 38 could be extended through the thickness of the slice by suitable means such as ion implantation. In this configuration, total depletion would not be required in order to prevent cross-talk.

With respect to the proximity tube itself, the cathode 12 is typically biased to a negative potential of about −6,000 to −10,000 volts; the anode 16 is typically at ground potential. Thus, electrons emitted by the cathode responsive to impinging light through the lens 10 are accelerated to the anode, the impact ionization generating a large number of charge carriers resulting in a gain of about 2,000.

In operation, the lens system 10 focuses a beam of reflected light onto the photo-emissive cathode 12 thereby generating electrons. These electrons are accelerated through the proximity focused tube 14 in a 1 to 1 positional basis to one of the quadrants of the anode impact ionization detector shown in more detail in FIG. 2. The electrons so generated are accelerated to 6–10 K electron-volts. Upon impact with the semiconductor anode, additional hole-electron pairs are generated, one hole-electron pair being generated for about each 3 ½ electron volts of energy. Thus, for each electron emitted by the cathode 12 about 2,000 electron hole pairs are produced by the accelerated electron upon impact with the anode, producing a gain of about 2,000. A separate lead from each quadrant of the detector is provided through the tube enclosure, as shown generally at 20 and 22.

In addition to the high gain advantage of the photomultiplier tube detector of the present invention, greatly improved signal to noise ratio, as compared to the conventional results since most of the noise comes from the dark leakage current associated with the junctions of the detector. The same amount of leakage current occurs with the present detector structure as with conventional quadrant detector structures, but the present invention produces an additional gain of around 2,000.

Still further, gain can be realized by utilizing detector material which enables operation in the avalanche mode. By way of example, for this mode of operation the silicon material would typically be 10 ohm-cm and it would be biased at 100 volts. Thus, in addition to the impact ionization gain of 2,000, an additional avalanche gain of 100 would be produced, resulting in gain of 200,000.

A comparison of a conventional quadrant silicon detector and the quadrant silicon photo-multiplier tube (SPMT) is shown in the table below.

| | QUADRANT SILICON DETECTOR | QUADRANT SPMT |
|---|---|---|
| 1.06 Q.E. | 40% | .5% |
| Gain | 1.0 | 1500 |
| I signal | $I_s$ | $191_s$ |
| I Dark | $I_p$ | $I_p$ |
| Response Time | $\tau_s$ | $\tau_s$ |

The high gain imager in accordance with the invention also finds advantageous utilization in low light level semiconductor charge transfer device imagers. Conventionally, semiconductor charge transfer devices such as described in the afore-referenced *Electronics* article have been utilized as imagers by detecting the photon induced charge in an array of charge transfer devices and reading out the signals on an element by element basis. This configuration is similar to the conventional silicon quadrant detector previously described except that the entire image, rather than a spot of light is recorded. These imagers are also limited in sensitivity.

Another type of conventional solid state imager is the "silicon diode array vidicon," which utilizes a vacuum tube in which a silicon slice having a large number of discrete diodes monolithically formed on the slice is used as the target. The diodes are electron beam interrogated, requiring a long electron beam optic system to produce a well-shaped beam. The beam is scanned in a raster pattern to interrogate each diode. The resulting mechanical structure is less reliable than complete solid state implementation, is relatively expensive, and has larger capacitance values with corresponding reduced signal-to-noise ratio.

Figure 3:
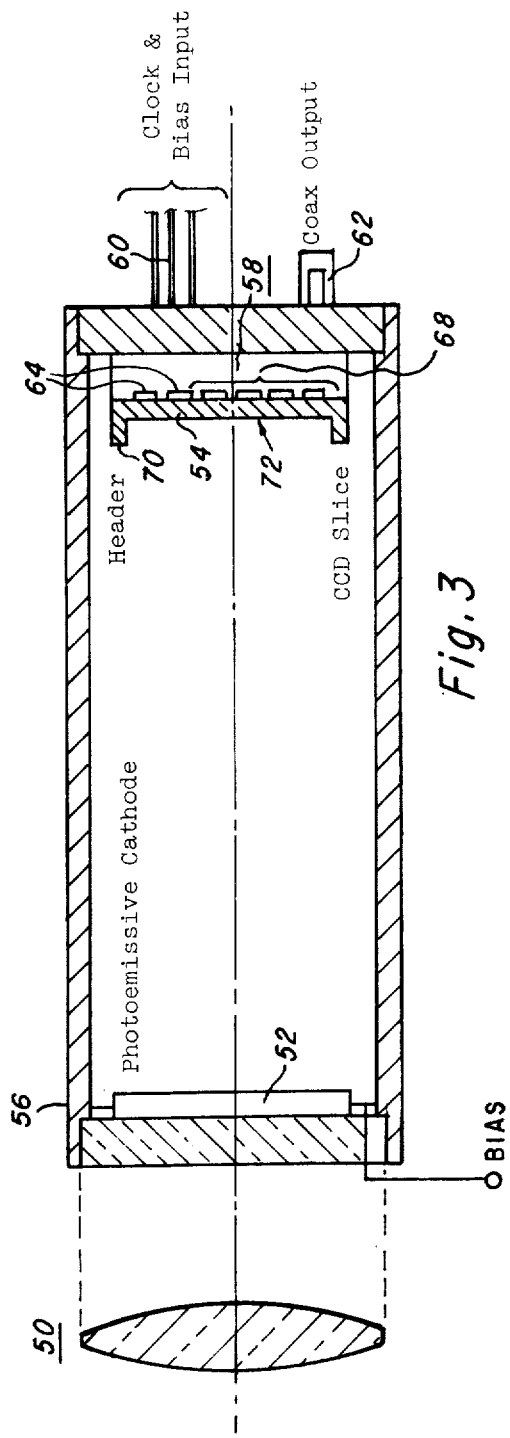
FIG. 3 is a schematic illustration of a suitable charge coupled device imager in accordance with the present invention.

In accordance with the present invention a charge transfer device array is utilized as the anode of a proximity tube photo-multiplier. A proximity tube is required since the image must be focused on a planar surface (the CCD array). An improved CCD imager in accordance with the invention is illustrated in FIG. 3. A surveyed image is focused by the lens system onto a suitable photo-emissive cathode 52. The cathode material is chosen to have photo-emission at the desired wavelength. suitable materials are described in the art. By way of illustration, for visible light detection, the cathode may comprise $N_a$—K—$C_s$—$S_b$. The cathode 52 and the charge transfer device array 54 are housed in an evacuated chamber defined by the proximity tube enclosure 56. Typically, the tube is evacuated to $10^{-8}$ millimeters of mercury. The charge transfer array 54 can be either charge coupled devices (CCD) or bucket brigade devices (BB). Preferably a CCD array is utilized.

The CCD array 54 is mounted on a suitable header 58. Control signals for the CCD array are connected through the walls of the enclosure 56 in vacuum sealing relationship at 60. The video output is taken through a vacuum sealing connection. Electrodes of the CCD are shown generally at 64 formed over an insulating layer 68. As illustrated in FIG. 3, the back surface 70 of the slice on which the CCD array is defined is etched by conventional etchants to a reduced thickenss in the region 72. This region is reduced in thickness to minimize lateral spreading of charge and thus maintain maximum resolution. Typically, this thickness is on the order of 10 microns.

It can be seen that the structure shown generally in FIG. 3 is effective to produce a gain on the order of 1,500–2,000, greatly enhancing low light level detection.

An additional advantage follows from utilizing the CCD configuration shown in FIG. 3, namely reduced capacitance and increased signal to noise ratio, as compared, e.g., to the previously described silicon diode array vidicon. This advantage is realized in that the amplifier and control circuitry for the CCD array can be formed on the same slice as the array. In the vidicon, however, external connections are required which introduces stray capacitance adversely affecting signal-to-noise ratio. This can be seen with reference to FIGS. 4 and 5 which illustrate, respectively, typical lead capacitances ($C_L$), stray capacitance ($C_S$) and amplifier capacitances ($C_A$) of a vidicon type imager and the CCD photo-multiplier imager in accordance with the invention. The signal to noise ratio of the CCD to the tube is given by $\sqrt{C_c/C_t}$ where $C_c$ is the total capacitance of the CCD ($C_L + C_S + C_A$) and $C_t$ is the capacitance of the tube ($C_L + C_S + C_A$). For the illustrated typical example, a signal-to-noise improvement of about 6 is produced.

With reference to FIGS. 6 and 7 a typical CCD array suitable for array 54 (FIG. 3) is illustrated. Such arrays and operation thereof are explained in the art and a detailed description herein is not required. In general, charge is stored in each of the resolution elements corresponding to a portion of an image. In the present invention, the charge is produced responsive to impact ionization of an accelerated electron, in turn produced responsive to an image focused thereon. The charge is read out element by element to an output shift register 60. In the configuration illustrated a column at a time is read out into the register 60. This register then serially outputs the signals to an output amplifier 62. A new column of information is then gated into shift register 60 and the same procedure is followed until all of the resolution elements have been read out. The array is then ready to detect a new image. Synchronization of read out and charge transfer is controlled by the conventional vertical scan generator 64 and transmission gates 66.

With respect to FIG. 7 there is shown in cross section a portion of a three phase CCD imager. Conventional integrated circuit fabrication techniques can be utilized.

While the present invention has been described with respect to various illustrative embodiments it will be apparent to those skilled in the art that changes can be made without departing from the spirit or scope of the invention.

What is claimed is:

1. A high gain semiconductor charge transfer device imager comprising a proximity tube including a substantially planar photo-emissive cathode for emitting a number of electrons corresponding to the intensity of visible radiation from an image focused thereon, the density pattern of emitted electrons substantially corresponding to the light intensity pattern of said image; an array of semiconductor charge transfer device storage elements defined on a first planar surface of a semiconductor anode spaced from said cathode, said anode defining a second planar impact ionization surface facing said cathode, said second surface defining a recess in registry with the region on said first planar surface wherein said array is defined, said recessed region defining a thickness of said semiconductor anode effective to minimize lateral spread of charge; means for biasing said anode and cathode to accelerate said emitted electrons to a higher energy and for impacting said accelerated electrons on said anode in substantially the same density pattern as said emitted electrons, said accelerated electrons respectively generating a plurality of hole-electron pairs in said semiconductor anode thereby providing substantial gain, said electron-hole pairs effectively modifying the charge of respective corresponding storage elements of said array, the pattern of said modified charge in said array substantially conforming to said density pattern of emitted electrons; and output means for addressing said array and selectively detecting the charge stored in each of said storage elements to provide an amplified output signal corresponding to said image.

2. A high gain semiconductor charge transfer device imager as set forth in claim 1 wherein said charge transfer device array comprises charge-coupled devices and said semiconductor anode comprises silicon.

3. In an imaging system, a charge transfer device imager comprising a semiconductor substrate having first and second opposite surfaces, said first surface having an array of charge transfer storage elements defined thereon, said second surface having a portion disposed for receiving energy corresponding to a visual image, said portion being in registry with said array of charge transfer storage elements on said first surface with the semiconductor substrate at said portion having a reduced thickness effective to substantially reduce lateral spread of charge.

4. The imager according to claim 3 wherein said substrate at said portion has a thickness on the order of 10 microns.

5. The imager according to claim 3 including output means for selectively addressing said array and detecting the charge storage in each of said storage elements to provide an output signal corresponding to said visual image.

6. An imaging system comprising in combination:
a. cathode means for emitting electrons responsive to exposure to energy from an image;
b. electron accelerating means for accelerating said emitted electrons to a higher energy; and
c. anode means for receiving said higher energy electrons, said anode including a semiconductor substrate having first and second surfaces on opposite sides, said first surface defining an array of charge transfer storage elements and said second surface having a portion in registry with said array of charge transfer storage elements on said first surface facing said cathode means for receiving said higher energy electrons with the semiconductor substrate at said portion having a reduced thickness effective to substantially reduce lateral spread of charge.

7. The imager according to claim 6 wherein said substrate at said portion has a thickness on the order of 10 microns.

8. The imaging system according to claim 6 wherein said cathode emits electrons responsive to exposure to energy of a preselected wavelength from said image.

9. The imaging system according to claim 8 wherein said cathode has maximum emission responsive to energy having a wavelength on the order of 1.06 microns.

10. The imaging system according to claim 6 including means for biasing said anode and cathode to accelerate said emitted electrons to said higher energy.

* * * * *